Sept. 12, 1950

E. L. TICHENOR ET AL 2,522,146

CONTOUR WELDING MACHINE

Filed Nov. 22, 1949

INVENTOR.
EDWIN L. TICHENOR &
WILLIAM CREMINS

BY

ATTORNEY.

Sept. 12, 1950      E. L. TICHENOR ET AL      2,522,146
CONTOUR WELDING MACHINE
Filed Nov. 22, 1949      2 Sheets-Sheet 2
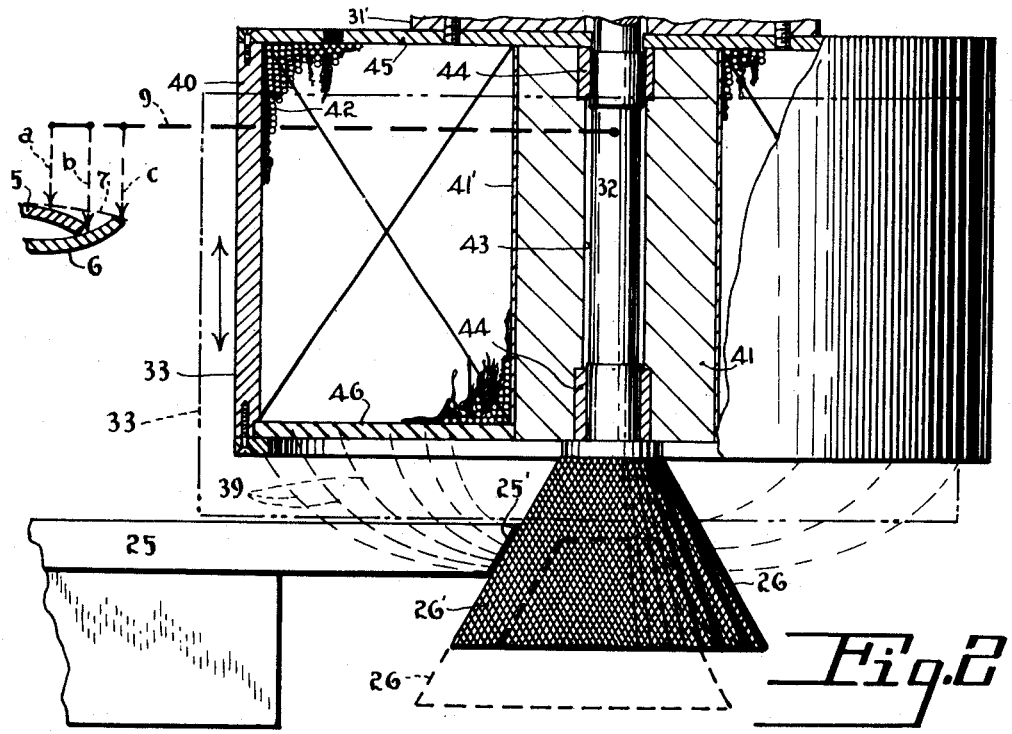
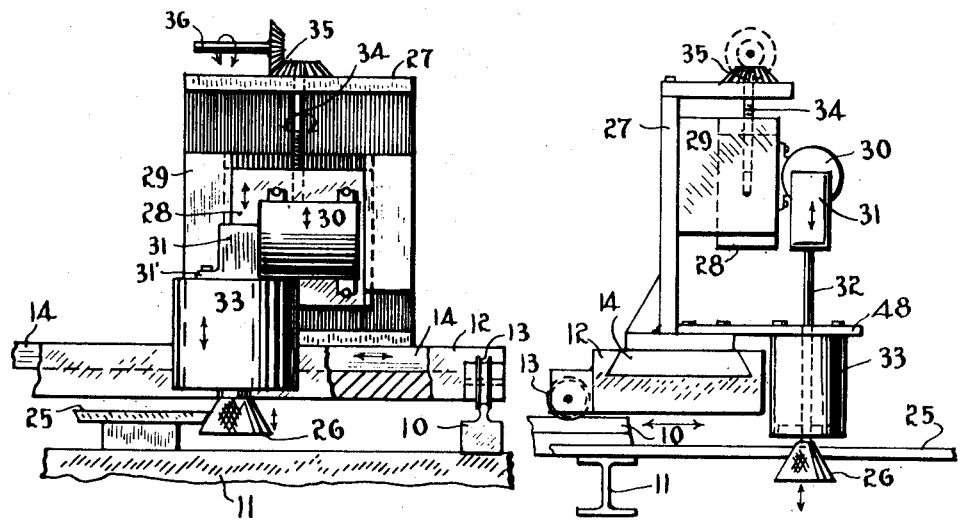
INVENTOR.
EDWIN L. TICHENOR &
WILLIAM CREMINS
BY 
ATTORNEY.

Patented Sept. 12, 1950

2,522,146

UNITED STATES PATENT OFFICE 2,522,146

CONTOUR WELDING MACHINE

Edwin L. Tichenor, Clifton, and William Cremins, Montclair, N. J., assignors to Curtiss-Wright Corporation, a corporation of Delaware Application November 22, 1949, Serial No. 128,762

7 Claims. (Cl. 219—8)

This invention relates to contour welding machines of the character having a template cam and follower for guiding the welding head along the workpiece, and its principal object is to provide improved cam following means for obtaining predetermined and precise semi-automatic control of a plurality of successive welding passes along a contoured section of the prepared workpiece.

In some types of welds requiring a material amount of weld metal, as for example the peripheral weld used to unite a pair of superposed preformed steel plates in the fabrication of a well-known form of hollow steel propeller blade, the weld is preferably made by depositing the weld metal in successive offset and overlapping "beads" by a corresponding number of welding passes, instead of by a single pass. In building up and enlarging this weld by successive passes, it has been customary to guide the welding head on each pass by means of a separate cam follower specifically designed for that pass so that the welding head traverses a distinct path. The welding operation is accordingly delayed because of the need for changing cam followers at the end of each pass; also the cam follower changes involve arbitrary steps and are limited in number and not subject to fine gradations.

In accordance with this invention, a single unitary cam follower having a variable following radius is adjustably related to the template cam in such manner that practically an infinite number of following adjustments can be readily made within the limits of the cam follower radii, thereby greatly facilitating and simplifying changing the path of the welding head within predetermined limits.

The invention will be more fully set forth in the following description referring to the accompanying drawings, and the features of novelty will be pointed out with particularity in the claims annexed to and forming a part of this specification.

Referring to the drawings:

Fig. 2 is an enlarged elevational view, partly in section and partly schematic, of cam follower structure shown in Fig. 1;

Fig. 3 is an end view, partly in section, of the cam follower and supporting carriage structure of Fig. 1; and Fig. 4 is an elevational side view of a modified form of the arrangement shown in Fig. 3.

Figure 1:
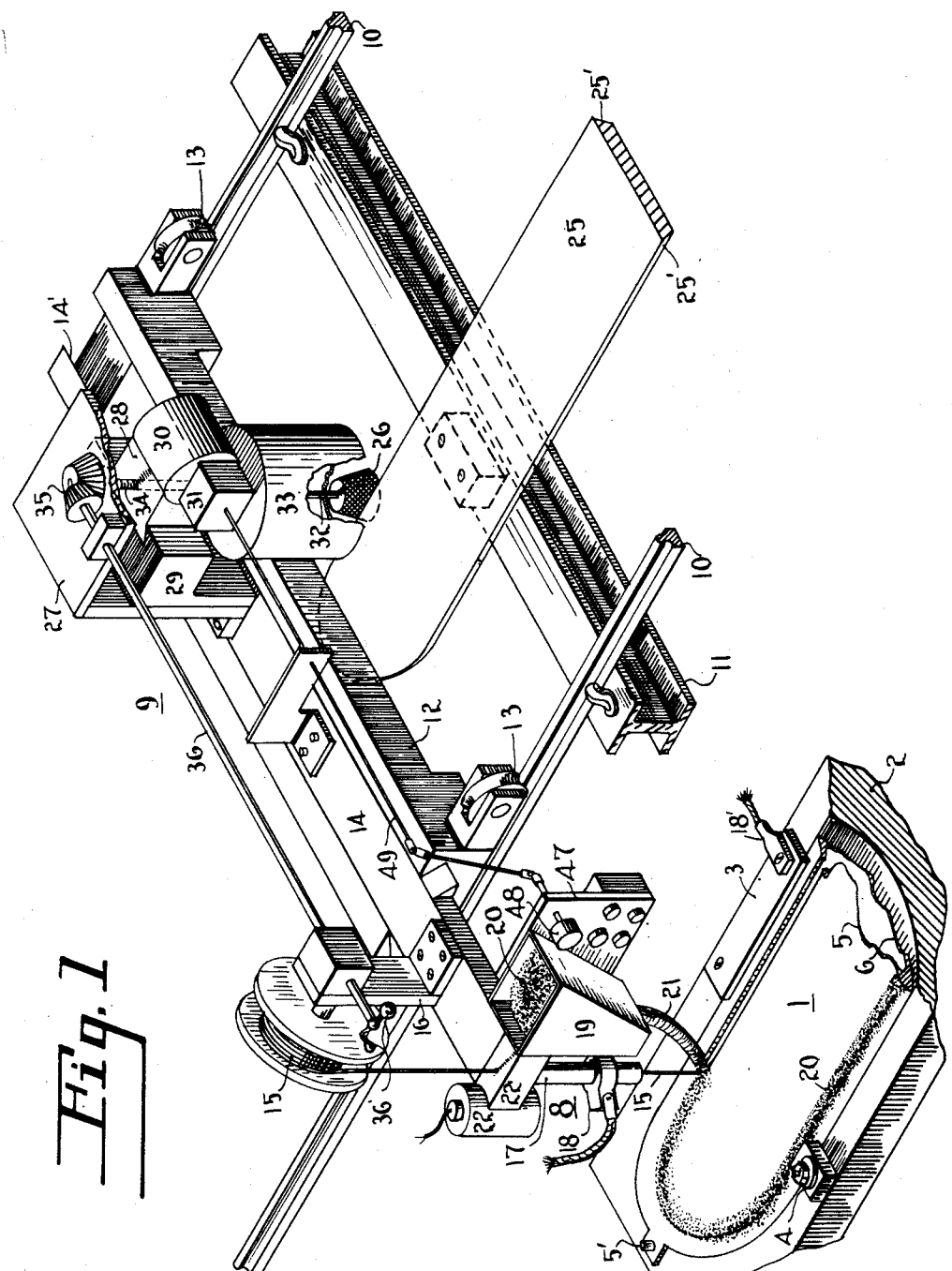
Fig. 1 is a perspective view, partly broken away, of a semi-automatic welding machine of the submerged welding type embodying the present invention.

The welding machine of Fig. 1 is of the so-called submerged arc welding type wherein the welding arc is continually submerged in flux thereby preventing inclusions and oxidation of the weld metal. In the specific welding process shown, a pair of preformed superposed steel plates, one of which overlaps the other as indicated in Fig. 2, are welded together at their peripheral edges to form a hollow steel propeller blade generally as disclosed in McKee Patent 2,214,338, granted September 10, 1940. A material amount of weld metal is used to build up the weld at the overlapping plate edge so that the welded junction of the plates is fairly symmetrical. Preferably the weld metal is deposited progressively in successive offset passes as diagrammatically indicated at Fig. 2 rather than at one time in a single pass and to this end the welding machine shown in Fig. 1 is adapted to be precisely adjusted for finely gradated successive positions of the welding head without material delay in the welding operation.

Referring particularly to Fig. 1, the workpiece generally indicated at 1 is supported on a stationary bed 2 and is secured thereto by suitable means such as the overhanging flange 3, adjustable clamp 4 and positioning pin 5'. The workpiece in the present instance comprises a pair of preformed steel plates 5 and 6 generally of camber form, the lower plate 6 over lapping the upper plate as best illustrated in Fig. 2 for the purpose of forming the weld joint, the completed weld being indicated by the dotted line 7 of Fig. 2.

The welding head is generally indicated at 8 and is mounted on a carriage 9 that in turn is mounted for longitudinal movement on tracks 10 supported on the fixed frame 11. The carriage comprises a supporting bridge structure 12 movable on rollers 13 longitudinally along the tracks 10, and a transverse member 14 carried by the bridge 12 and freely slidable in a groove 14' transversely thereof. The welding head 8 is carried by the transverse member 14 so that the welding head can be moved by the carriage both longitudinally and transversely with respect to the workpiece for following a selected welding path.

The welding head per se is carried as a unit by the transverse member 14 and may comprise any suitable arrangement for feeding weld rod to the workpiece. As shown, a spool of weld rod 15 is mounted on a bracket 16 that is in turn secured to the transverse member 14, and the weld rod is fed to a cylindrical guide member 17 to which an electrode terminal 18 is connected for electric current supply. The other terminal 18' may be connected to the bed at the flange 3. A flux hopper 19 containing a suitable flux 20 is likewise carried by the transverse member 14. The hopper 19 is provided with a feed pipe 21 for feeding flux to the weld rod where it is in contact with the workpiece, i. e. at the welding arc. The rate of feed of the weld rod can be controlled by a motor 22 and suitable speed reducing and tensioning means indicated at 22'. The submerged arc welding method per se is well known in the art and further description thereof is unnecessary for a complete understanding of the present invention.

For the purpose of guiding the welding head in successive offset passes around the non-linear periphery of the workpiece, a cam plate 25 is suitably rigidly secured to the stationary frame 11. This fixed cam plate is contoured so as to represent the average path of the welding head along the workpiece and is beveled along its edge 25' for a purpose presently described. A cam follower 26 is mounted on the carriage 9 and is adapted to be moved by separate motive means along the cam edge so as to move the carriage accordingly. Specifically, the cam follower is mounted on the transverse member 14 so that as the cam follower changes its longitudinal or transverse position with respect to the cam plate, the welding head, which is also mounted on the transverse member 14, changes its position accordingly.

As shown in Figs. 1, 2 and 3, the cam follower 26 comprises a cone-like member, specifically a truncated cone, having its vertical axis positioned substantially transversely of the cam plate 25 and provided with a knurled surface 26' for frictional engagement with the beveled edge of the cam plate. The follower assembly comprises an offset bracket support 27 suitably secured to the transverse member 14, a slide member 28 guided for vertical movement within a guide block 29 forming part of the supporting bracket 27, a motor 30 carried by the slide 28 and connected to the cam follower 26 through a gear reducer 31 and shaft 32, and an electromagnet 33 likewise carried by and movable with the slide 28. As best illustrated in Figs. 2 and 3, the electromagnet 33 is positioned immediately above the small diameter end of the truncated cam follower and in overhanging relation to the cam plate 25. The complete slide assembly, including the member 28, motor 30, electromagnet 33 and cam follower 26, is vertically adjustable as a unit by means of a lead screw 34 threaded in the slide 28 and connected through bevel gearing 35 and shaft 36 to a manually operable crank 36' for adjusting the vertical position of the cam follower and associated unit. The shaft 36 is suitably mounted in bearings on the brackets 16 and 27 respectively. It will therefore be seen that by vertical positioning of the cam follower 26 the effective cam follower radius can be varied so as in effect to change the size of the cam template. Thus it is apparent that starting with the small diameter end of the cam, a welding pass corresponding to the innermost edge of the weld can be selected and by gradually elevating the cam follower for successive passes, the weld can be gradually enlarged by expanding the path to any degree desired by the operator within the limits of the cam radii.

The follower 26 is held in firm frictional engagement with the coacting beveled edge 25' of the cam plate 25 by means of electromagnet 33, the latter being arranged so as to include both the plate and follower, each of which is composed of magnetic material such as steel, in the path of magnetic flux as indicated at 39 in Fig. 2. In the arrangement shown in Figs. 1 to 3, the electromagnet 33 is movable as a unit with the follower on the vertical slide 28.

The electromagnet is of the annular type in order to overhang the cam plate 25 regardless of the relative position of the follower and cam and comprises a cylindrical shell 40 of magnetic material having a central iron core 41 surrounded by a non-magnetic sleeve 41' about which the energizing coil 42, partly indicated in Fig. 2, is disposed. The core 41 is formed with a central bore 43 having a pair of non-magnetic sleeve bearings 44 for the rotatable follower shaft 32. The electromagnet housing is completed by end plates 45 and 46 of magnetic and non-magnetic materials respectively suitably secured in position for retaining the pitch-embedded coil 42. The electromagnet is supported by the motor gear box 31, the lower flange 31' of which is suitably secured as indicated in Fig. 2 to the upper end plate 45 of the magnet.

The small diameter end of the follower is located closely adjacent to the core 41 in order to shape the air gap beneath the magnet so that the greatest amount of flux will link the cam plate and follower thereby to insure sufficient holding force. If the follower were inverted so that the large diameter end were adjacent to the electromagnet, the follower itself would shunt such a large part of the flux that the magnetic attraction between the cam plate and the follower would be unsufficient. When arranged in the manner shown in Fig. 2, the lateral knurled surface 26' of the follower is urged into such close frictional engagement with the cam 25 that rotation of the follower by means of the motor 30 causes the follower to move along the cam edge carrying with it the longitudinal and transverse elements of the carriage assembly 9 in turn guiding the welding head 8.

When the path of the welding head is to be changed after a pass, the vertical slide 28 is manually adjusted as desired by means of the crank 36' so as to raise or lower the follower and change the effective follower radius. Such an adjustment is indicated in dotted lines in Fig. 2 wherein the radius at the mean diameter part of the follower determines the position of the welding head. This can be represented by position $b$, Fig. 2. In the dotted line position of the follower, the unit has been shifted downward and to the left so that the minimum follower radius is effective as represented by position $a$, Fig. 2. Since in this latter case the driving follower has a smaller radius, the motor speed must be increased in order to maintain constant speed of the welding head and this may be readily accomplished at the welding head control panel 47 by the operator by adjusting a motor speed dial 48 which is suitably connected by a linkage 49 to the motor or to its reduction gearing for varying the motor speed and hence the speed of rotation of the follower 26. When the follower unit is lifted to use the maximum radius of the follower, the welding pass is shifted as indicated to position $c$, Fig. 2.

It will be apparent from the foregoing description that the operator after completing a peripheral pass on the propeller blade workpiece shown in Fig. 1 need but adjust the crank 36' to the desired extent and adjust the speed of the follower motor accordingly for immediately proceeding with the next offset pass and so on until the weld is completely finished. No delay in the welding operation is introduced by this simple adjustment and the spacing between the welding passes can be gradated to a fine degree if such is desired, as clearly indicated by the schematic connection in Fig. 2 between the follower and the welding head.

In the modified arrangement shown by Fig. 4, the electromagnet 33 is directly supported on and carried by the transverse member 14 by means of a bracket 48 so as to maintain a constant magnetic gap between the electromagnet and the cam plate 25. In this case, the follower 26 is independently movable vertically of the electromagnet by means of its operating shaft 32, the latter being operated by the motor 30 which is secured to the vertical slide 28 in the manner above described. With this arrangement, the holding force between the follower and cam plate can be maintained more nearly constant.

It should be understood that this invention is not limited to specific details of construction and arrangement thereof herein illustrated, and that changes and modifications may occur to one skilled in the art without departing from the spirit of the invention.

What is claimed is:

1. In a welding machine having a welding head mounted for longitudinal and transverse movement for depositing weld metal along a weld path, means for guiding said welding head for successive offset passes along said weld path comprising a fixed cam member shaped to represent the aforesaid weld path, a cam follower having a variable radius biased into frictional engagement with the edge of said cam member, said welding head being arranged to follow corresponding movements of said cam follower, means for rotating said cam follower whereby it is caused to move bodily along the edge of said cam and thereby to cause corresponding movement of said welding head, and means for adjusting the position of said cam follower with respect to said cam for varying the effective length of follower radius whereby the path of said welding head can be varied accordingly.

2. In a welding machine having a welding head mounted for longitudinal and transverse movement for depositing weld metal along a weld path, means for guiding said welding head for successive offset passes along said weld path comprising a fixed cam member shaped to represent the aforesaid weld path, a cam follower generally cone-like in form laterally biased into frictional engagement with the edge of said cam member, said welding head being related to said cam follower so as to follow the movement thereof, means for rotating said cam follower about the vertical axis of the cone whereby it is caused to move bodily along the edge of said cam and thereby to cause corresponding movement of said welding head, and means for adjusting the position of said cam follower transversely with respect to said cam for varying the effective length of follower cone radius whereby the path of said welding head can be varied accordingly.

3. In a semi-automatic welding machine having a welding head mounted for longitudinal and transverse movement for depositing weld metal along a weld path, means for guiding said welding head for successive offset passes along said weld path comprising a fixed cam member shaped to represent the aforesaid weld path, a cam follower in the form of a truncated cone biased into lateral frictional engagement with the edge of said cam member, said welding head arranged to follow corresponding movements of said cam follower, variable speed means for rotating said cam follower about the vertical axis of the cone whereby it is caused to move bodily along the edge of said cam and thereby to cause corresponding movement of said welding head, and means for adjusting both said variable speed means and the position of said cam follower along its vertical axis transversely with respect to said cam for varying the effective length of follower cone radius whereby the path of said welding head can be varied accordingly.

4. In a semi-automatic welding machine having a welding head mounted for longitudinal and transverse movement for depositing weld metal along a non-linear weld path, means for guiding said welding head for successive offset passes along said weld path comprising a fixed cam plate contoured to represent the aforesaid non-linear weld path, a cam follower generally cone-like in form positioned so that its vertical axis is transverse of said cam plate, means for biasing said follower laterally into frictional engagement with the contoured edge of said cam plate, said welding head arranged to follow corresponding movements of said cam follower, means for rotating said cam follower about its vertical axis whereby it is caused to move bodily along the contoured edge of said cam plate and thereby to cause corresponding movement of said welding head, and means for adjusting the position of said cam follower transversely with respect to said cam plate for varying the effective length of follower cone radius whereby the path of said welding head can be varied accordingly.

5. In a welding machine having a welding head mounted for longitudinal and transverse movement for depositing weld metal along a weld path, means for guiding said welding head for successive offset passes along said weld path comprising a fixed cam plate of magnetic material shaped to represent the aforesaid weld path, a cam follower for said cam comprising a generally cone-like member of magnetic material, said cam having a beveled edge for frictional engagement with the lateral surface of said cone member, magnetic means disposed adjacent to said cone member and said cam for urging said cone member into frictional engagement with said cam, said welding head being related to said cam follower so as to follow the movement thereof, means for rotating said conical member whereby it is caused to move bodily along the cam edge and thereby to cause corresponding movement of said welding head, and means for adjusting the position of said cone member along its vertical axis with respect to said cam for varying the effective length of follower radius whereby the path of said welding head can be varied accordingly.

6. In a welding machine having a welding head mounted for longitudinal and transverse movement for depositing weld metal along a non-linear weld path, means for guiding said welding head for successive offset passes along said weld path comprising a fixed cam plate of magnetic material contoured to represent the aforesaid weld path, a cam follower for said cam in the form of a truncated cone also composed of magnetic material, said cam having a beveled edge for frictional engagement with the lateral surface of said cone member, circular magnetic means disposed concentrically of and adjacent to the small-diameter end of said follower and said cam for biasing said follower laterally into frictional engagement with said cam at all positions of said follower with respect to said cam, said welding head being related to said follower so as freely to follow the movement thereof, means for rotating said follower whereby it is caused to move bodily along the cam edge and thereby to cause corresponding movement of said welding head, and means for adjusting the follower along the vertical axis of the truncated cone with respect to said cam for varying the effective length of follower radius whereby the path of said welding head can be varied accordingly.

7. In a welding machine having a welding head mounted on a carriage for longitudinal and transverse movement for depositing weld metal along a non-linear weld path, means for guiding said welding head for successive offset passes along said weld path comprising a fixed cam plate of magnetic material contoured to represent the aforesaid non-linear weld path, a cam follower for said cam mounted on said carriage comprising a truncated cone-like member composed of magnetic material, the vertical axis of said cone member being transversely positioned with respect to said cam plate, said cam having a beveled edge for engagement with the lateral surface of said cone member, an electromagnet mounted on said carriage adjacent to the small diameter end of said cone member and overhanging said cam plate for magnetically biasing said cone member into lateral frictional engagement with said cam, said welding head and carriage being movable with said cam follower, means for rotating said conical member about its vertical axis whereby it is caused to move bodily along the cam edge and thereby to cause corresponding movement of said welding head, and means for adjusting the position of the cone member along its vertical axis with respect to said cam for varying the effective length of follower cam radius whereby the path of said welding head can be varied accordingly.

EDWIN L. TICHENOR.
WILLIAM CREMINS.

REFERENCES CITED

The following references are of record in the file of this patent:

UNITED STATES PATENTS

| Number | Name | Date |
|---|---|---|
| 1,978,042 | Dodge | Oct. 23, 1934 |
| 1,983,343 | Chapman | Dec. 4, 1934 |
| 2,460,914 | Wright | Feb. 8, 1949 |